(12) United States Patent
Mabuchi et al.

(10) Patent No.: US 8,184,207 B2
(45) Date of Patent: May 22, 2012

(54) IMAGE SIGNAL INPUT CIRCUIT

(75) Inventors: Shigeki Mabuchi, Tama (JP); Atsushi Watanabe, Tama (JP); Makoto Seino, Tama (JP); Nagayoshi Dobashi, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 295 days.

(21) Appl. No.: 12/759,875

(22) Filed: Apr. 14, 2010

(65) Prior Publication Data

US 2010/0271104 A1    Oct. 28, 2010

(30) Foreign Application Priority Data

Apr. 24, 2009   (JP) ................. 2009-107090

(51) Int. Cl.
*H04N 5/18* (2006.01)
(52) U.S. Cl. .............. 348/695; 348/691; 348/694
(58) Field of Classification Search .............. 348/695, 348/691, 694, 696, 697, 698; *H04N 5/18*, *H04N 5/16*
See application file for complete search history.

(56) References Cited

U.S. PATENT DOCUMENTS

| | | | | |
|---|---|---|---|---|
| 5,729,285 | A * | 3/1998 | Peterson et al. | 348/162 |
| 6,229,371 | B1 * | 5/2001 | Nishimura et al. | 327/309 |
| 6,512,553 | B2 * | 1/2003 | Page | 348/569 |
| 7,023,497 | B2 * | 4/2006 | Fang et al. | 348/694 |
| 2009/0102978 | A1 * | 4/2009 | Ota | 348/723 |

FOREIGN PATENT DOCUMENTS

JP     11-308063     11/1999

OTHER PUBLICATIONS

Low-Cost Three-Channel 4th-Order Standard Definition Video Filter Driver Fairchild Semiconductor Corporation 2006, FMS6143, Rev. 4.0.3, pp. 1-9.
Low-Cost, Three-Channel, 6th-Order, High Definition, Video Filter Driver Fairchild Semiconductor Corporation 2005, FMS6363, Rev. 1.0.3, pp. 1-9.
Six Channel, 6th-Order SD/HD Video Filter Driver Fairchild Semiconductor 2006, FMS6346, Rev.1.0.4, pp. 1-10.
3-Channel SDTV Video Amplifier With 5th-Order Filters and 6-dB Gain Texas Instruments 2006, THS7314, pp. 1-20.
3-Channel HDTV Video Amplifier With 5th-Order Filters and 6-dB Gain Texas Instruments 2008, THS7316, pp. 1-24.
3-Channel Video Amp With Standard Definition Reconstruction Filters ON Semiconductor 2008, Rev. 4, NCS2553/D, pp. 1-8.
3-Channel Video Amp With High Definition Reconstruction Filters ON Semiconductor 2008, Rev. 3, NCS2563/D, pp. 1-8.
Low-Cost, 6-Channel SD Plus HD/SD Selectable Video Filters and Buffers MAXIM Integrated Products 2008, MAX11506/MAX11507, pp. 1-10.

* cited by examiner

*Primary Examiner* — Trang U Tran
(74) *Attorney, Agent, or Firm* — IPUSA, PLLC

(57) ABSTRACT

An image signal input circuit includes an input terminal configured to receive an image signal, a clamp circuit configured to hold a sink chip voltage contained in the image signal to be a constant value, a level shift circuit that includes a first emitter follower having a first transistor and a first current source, and a second emitter follower having a second transistor and a second current source, a base of the second transistor being connected to an emitter of the first transistor, and that is configured to shift a level of the sink chip voltage which is held constant, and an electric current source configured to attract a base current of the first transistor.

6 Claims, 9 Drawing Sheets

IMAGE SIGNAL INPUT CIRCUIT

CROSS-REFERENCE TO RELATED APPLICATIONS

This patent application is based upon and claims the benefit of priority of Japanese Patent Application No. 2009-107090 filed on Apr. 24, 2009, the entire contents of which are incorporated herein by reference.

BACKGROUND OF THE INVENTION

1. Field of the Invention

The present invention relates to an image signal input circuit including a clamp circuit for holding a sink chip voltage constant.

2. Description of the Related Art

It is necessary to hold a sink chip voltage, which is a voltage at a chip end (i.e. sink chip) of a reference synchronous signal, constant in order to detect vertical and horizontal synchronizing signals contained in an analog image signal. The conventional driver IC for image signals uses an input circuit having a clamp circuit for detecting the vertical and horizontal synchronizing signals. An input circuit of the bias type is used to process a signal which does not contain the sink chip. As described, one example of a circuit for making the sink chip voltage constant is a clamp circuit.

FIG. 9 illustrates an example of conventional clamp circuits. For example, the conventional clamp circuit 10 is built in a driver IC 20 for driving an image signal. An input terminal T of the driver IC 20 is connected to a previous stage circuit 21 such as a Digital to Analog Converter (DAC) via a capacitor C1 for removing a direct current component of a signal.

The clamp circuit 10 holds a sink chip voltage of an image signal input from the input terminal T constant, and supplies the image signal to a subsequent stage circuit 22 of the driver IC 20. The clamp circuit 10 includes a voltage source V1 and a transistor Q1. The transistor Q1 is an NPN transistor.

The collector of the transistor Q1 is connected to a power source Vcc, and the emitter of the transistor Q1 is connected to the input terminal T of the driver IC 20 and the subsequent stage circuit 22. The base of the transistor Q1 is connected to ground GND via a voltage source V1. The voltage Va of the voltage source V1 is set as an optimum operating point of the subsequent stage circuit 22. The sink chip voltage of the clamp circuit 10 is fixed at (Va-Vf1). Vf1 is a forward voltage of the transistor Q1.

When the sink chip voltage is lower than the voltage Va, the capacitor C1 receives an electric charge from the power source Vcc via the transistor Q1. Then, the sink chip voltage rises. Further, when the sink chip voltage is higher than the voltage (Va-Vf1), the voltage is kept.

Such a clamp circuit is disclosed in, for example, Patent Document 1.

The conventional clamp circuit 10 requires the capacitor C1 for holding the sink chip voltage constant. When the driver IC 20 having the built-in clamp circuit 10 is used, the capacitor C1 needs to be mounted to connect the driver IC 20 to the previous stage device 21.

In recent years, various electronic devices are being downsized. Because of the compactness of the electronic devices, circuit sizes of the electronic devices are required to be reduced. For example, it is required to solve a problem of a connection of a previous stage device with the driver IC via a capacitor. [Patent Document 1] Japanese Unexamined Patent Publication No. 11-308063

SUMMARY OF THE INVENTION

Accordingly, embodiments of the present invention may provide a novel and useful image signal input circuit solving one or more of the problems discussed above.

More specifically, the embodiments of the present invention may provide an image signal input circuit which may be directly connected to a previous stage device using a clamp function installed in the image signal input circuit.

According to an aspect of the present invention there is provided an image signal input circuit including an input terminal (IN1) configured to receive an image signal;

a clamp circuit (210) configured to hold a sink chip voltage contained in the image signal to be a predetermined value;

a level shift circuit (220) that includes a first emitter follower having a first transistor (Q30) and a first current source (I30), and a second emitter follower having a second transistor (Q40) and a second current source (I40), a base of the second transistor being connected to an emitter of the first transistor, and that is configured to shift a level of the sink chip voltage held to be the predetermined value; and an electric current source (230) configured to attract a base current of the first transistor.

According to another aspect of the present invention there is provided the image signal input circuit, wherein the clamp circuit may include a third transistor (Q10), a collector and a base of the third transistor being connected, a third current source (I10) for supplying an electric current to the third transistor, and a fourth transistor (Q40) for supplying the electric current to the input terminal.

According to another aspect of the present invention there is provided the image signal input circuit, wherein the clamp circuit may hold the sink chip voltage to be 0 V.

According to another aspect of the present invention there is provided the image signal input circuit, wherein the clamp circuit may further include a fifth transistor (Q50) and a fourth electric current source (I50), and a collector of the fifth transistor is connected to the collector of the third transistor, an emitter of the fifth transistor is connected to the base of the third transistor, and a base of the fifth transistor is connected to the fourth electric current source.

According to another aspect of the present invention there is provided the image signal input circuit, wherein an image signal input circuit may further include a protection circuit (240) connected between an input terminal and a ground (GND), wherein the protection circuit includes a diode (D10) having a withstand voltage lower than disruptive voltages of the clamp circuit, the level shift circuit and the electric current source, and a protection transistor (Q60) connected in parallel.

According to another aspect of the present invention there is provided the image signal input circuit, wherein when the voltage of the input terminal becomes greater than a voltage at which the fourth transistor turns off, a clamp function of the clamp circuit is stopped.

The above reference symbols in the above parentheses are attached to enhance readability of sentences only as an example. Of course, the present invention is not limited to what is made more readable with the above reference symbols in the specification and the figures.

Additional objects and advantages of the embodiments are set forth in part in the description which follows, and in part will become obvious from the description, or may be learned by practice of the invention. The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

A description is given below, with reference to the FIG. 1 through FIG. 8 of embodiments of the present invention.

In the embodiments described below, the reference symbols typically designate as follows: 100: driver IC; 200: 200A, 200B, 200C, 200D: image signal input circuit; 201: subsequent stage circuit; 202: previous stage device; 210, 210A: clamp circuit; 220, 220A: level shift circuit; 230, 230A: weak electric current source; 240: protection circuit; and 800: external circuit.

When a clamp voltage is held to be 0 V, a clamp function is stopped to be performed using bias of a previous device. Therefore, it becomes possible to directly connect an image signal input circuit with, a previous stage device or a driver IC with the previous stage device without providing a capacitor on the outside.

Embodiment 1

Figure 1:
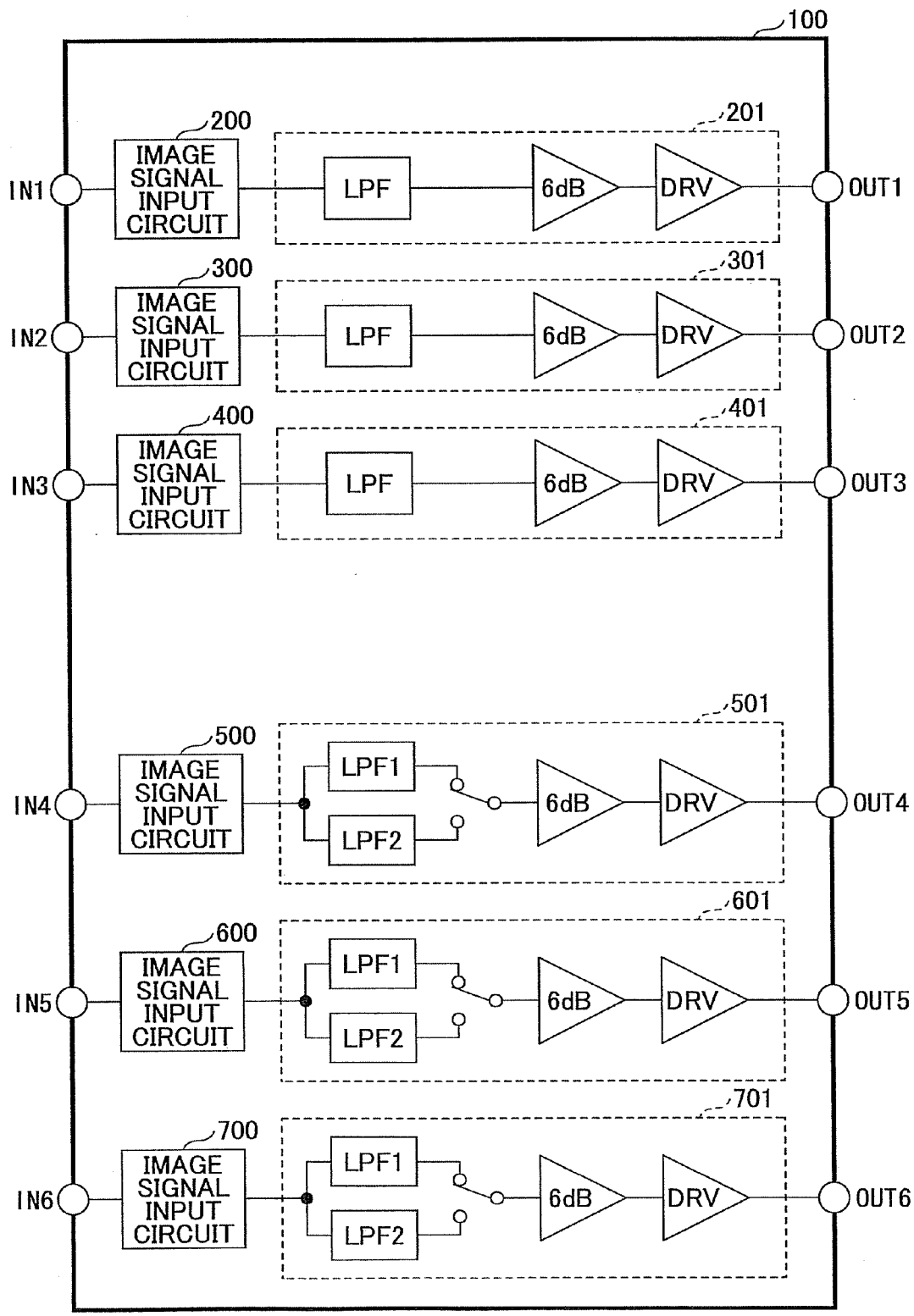
FIG. 1 illustrates a driver IC in which image signal input circuits of Embodiment 1 are installed.

Next, an embodiment of the present invention is described with reference to figures. FIG. 1 illustrates a driver IC in which image signal input circuits of Embodiment 1 are installed.

The driver IC 100 of Embodiment 1 includes input terminals IN1 to IN6, to which an image signal is input, and output terminals OUT1 to OUT6.

An image signal input circuit 200 and a subsequent stage circuit 201 are sequentially connected between the input terminal IN1 and the output terminal OUT1. An image signal input circuit 300 and a subsequent stage circuit 301 are sequentially connected between the input terminal IN2 and the output terminal OUT2. An image signal input circuit 400 and a subsequent stage circuit 401, an image signal input circuit 500 and a subsequent stage circuit 501, an image signal input circuit 600 and a subsequent stage circuit 601, and an image signal input circuit 700 and a subsequent stage circuit 701 are also sequentially connected between input terminals IN3 to IN6 and output terminals OUT3 to OUT6, respectively.

For example, a composite video signal (CVBS signal) is input to the driver IC 100. For example, a brightness signal (Y signal) is input to the input terminal IN2. For example, a chroma signal (C signal) is input to the input terminal IN3. For example, a color-difference signal (Pr signal) is input to the input terminal IN4. For example, a color-difference signal (Pb signal) is input to the input terminal IN5. For example, a brightness signal (Y signal) is input to the input terminal IN6.

Ordinarily, the chroma signal (C signal) is shaped like a sinusoidal wave. Meanwhile, the composite video signal (CVBS signal), the brightness signal (Y signal) or the like are signals which change on one side of a reference voltage. There is a case where a waveform caused along with synchronization is attached to the other side of the reference voltage. Therefore, clamping may be required for the composite video signal (CVBS signal), the brightness signal (Y signal) or the like. With clamping, the one side of the signal may be limited up to an extreme value, and the other side of the signal may be changed as is. Hereinafter, an input circuit undertaking clamping is called an input circuit of the clamp type.

Since the C signal or the like is not associated with a synchronization signal, it is sufficient to provide a bias function for resetting a direct current (DC) voltage level which is lost by, for example, capacitance coupling. A clamp function is unnecessary. Hereinafter, an input circuit having the bias function and not having the clamp function is called an input circuit of the bias type.

The image signal input circuits 200 thru 700 have similar structures. The image signal input circuits 200 to 700 are described in detail later. Further, in the driver IC 100, the subsequent stage circuits 201, 301 and 401 have similar structures, and the subsequent stage circuits 501, 601 and 701 have similar structures.

The subsequent stage circuits 201, 301 and 401 include low-pass filters (LPF) from which outputs of the image signal input circuits 200, 300 and 400 are supplied, 6 dB amplifiers, and drivers to which outputs of the 6 dB amplifiers are supplied. The subsequent stage circuits 501, 601 and 701 include LPF1 and LPF2 to which outputs from the image signal input circuits 500, 600 and 700 are supplied, switching elements for switching over between LPF1 and LPF2, 6 dB amplifiers into which outputs from LPF1 and LPF2 are input, and drivers to which outputs of the 6 dB amplifiers are supplied.

Only the input and output terminals used to input or output the image signals are illustrated in FIG. 1. However, the driver IC 100 may additionally have a terminal for inputting or outputting other signals.

Figure 2:
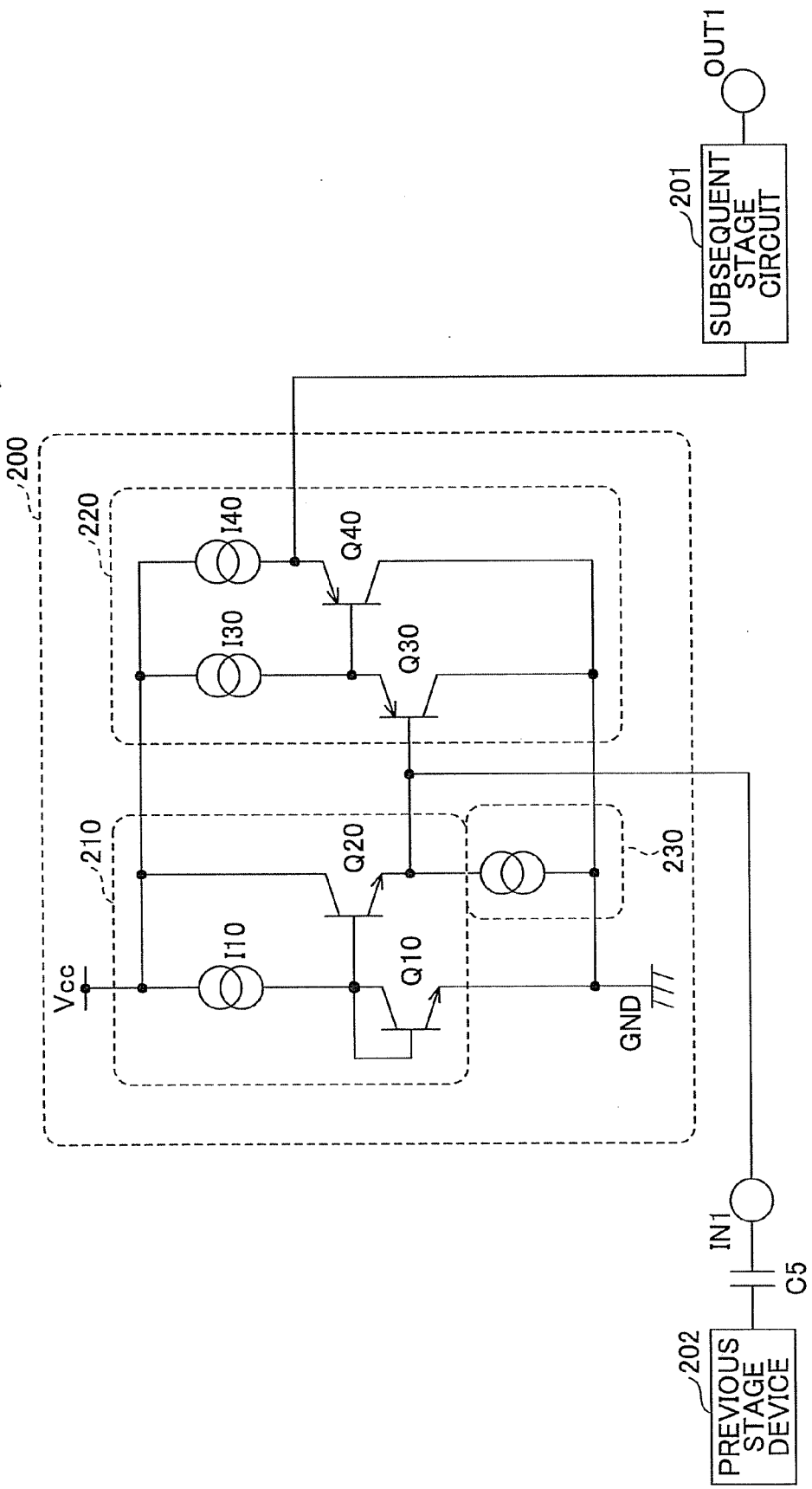
FIG. 2 is a first view for illustrating the image signal input circuits of Embodiment 1.

The image signal input circuits 200, 300, 400, 500, 600 and 700 of Embodiment 1 are described in reference to FIG. 2. The image signal input circuit 200 is used for explanation, as an example. FIG. 2 is a view for illustrating the image signal input circuit of Embodiment 1.

The image signal input circuit 200 includes a clamp circuit 210, a level shift circuit 220 and a weak electric current source 230. The image signal input circuit 200 of Embodiment 1 may be used when a capacitor is connected between the input terminal IN1 and the previous stage device 20.

The image signal input circuit 200 may be used when the image signal input circuit 200 is directly connected to the previous stage device 202 without connecting the capacitor between the input terminal IN1 and the previous stage device.

Referring to FIG. 2, a case where a capacitor C5 is connected between the image signal input circuit 200 and the previous stage device 202 is described.

The image signal input circuit 200 holds a sink chip voltage which is contained in the CVBS signal input signal input from the input terminal IN1 to be 0 V. An operation point for connecting to the subsequent stage circuit 201 is determined by the level shift circuit 220.

The clamp circuit 210 of Embodiment 1 includes an electric current source I10, a transistor Q10 and a transistor Q20. The transistor Q10 and the transistor Q20 are NPN transistors. The electric current source I10 is connected to a power source Vcc at one end and connected to the collector of the transistor Q10 at the other end.

The base of the transistor Q10 is connected to the collector of the transistor Q10, and the emitter of the transistor Q10 is connected to ground GND. The base of the transistor Q20 is connected to the collector of the transistor Q10, and the collector is connected to the power source Vcc. The emitter of the transistor Q20 is connected to the weak electric current source 230 and the base of a transistor Q30 of the level shift circuit 220. Base-emitter voltages of the transistor Q10 and the transistor Q20 of Embodiment 1 are equal.

The voltage generated by the resistance of the weak electric current source 230 is small enough to be ignorable in comparison with the voltage Vcc of the power source. In Embodiment 1, since the base-emitter voltage of the transistor Q10 and the transistor Q20 are equal, it is possible to hold the clamp voltage of the input terminal IN1 to be substantially 0 V. Further, temperature characteristics of the transistor Q10 and the transistor Q20 cancel each other out.

The level shift circuit 220 of Embodiment 1 includes the transistor Q30, a transistor Q40, an electric current source I30 and the electric current source I40. The transistor Q30 and the transistor Q40 are PNP transistors.

An end of the electric current source I30 and an end of the electric current source I40 are connected to the power source Vcc. The other end of the electric current source I30 is connected to the emitter of the transistor Q30. The base of the transistor Q30 is connected to the input terminal IN1 and the emitter of the transistor Q20. The collector of the transistor Q30 is connected to ground GND.

The other end of the electric current source I40 is connected to the emitter of the transistor Q40. The base of the transistor Q40 is connected to the emitter of the transistor Q30, and the collector of the transistor Q40 is connected to ground GND. The emitter of the transistor Q40 is connected to the LPF included in the subsequent stage circuit 201.

The weak electric current source 230 is connected to the emitter of the transistor Q20 and the base of the transistor Q30 at one end, and connected to the ground GND at the other end. The weak electric current source 230 of Embodiment 1 attracts a base current of the transistor Q30 of the level shift circuit 220 to thereby restrict a rise of the voltage of the input terminal IN1.

The image signal input circuit 200 of Embodiment 1 can hold the voltage of the input terminal IN1 to be 0 V with a function of the clamp circuit 210 and a function of attracting the bass current of the transistor Q30.

A relationship between the base current of the transistor Q30 and a current I230 of the weak electric current source 230 is designed to satisfy the following formula 1 regardless of variation of the voltage of the power source and variation of the ambient temperature.

<Formula 1>
Base current of transistor Q30<Current I230 of weak electric current source 230

In Embodiment 1, it is possible to normally operate the clamp circuit 210 by designing the image signal input circuit 200 to satisfy Formula 1.

A case where a capacitor C5 is connected between the image signal input circuit 200 and the previous stage device 202 is described below.

When the sink chip voltage contained in the CVBS signal input from the input terminal IN1 is higher than 0 V, the transistor Q20 of the clamp circuit 210 is turned off. Then, the weak electric current source 230 is discharged.

When the sink chip voltage of the image signal input circuit 200 of Embodiment 1 is less than 0 V, an electric current is supplied from the power source Vcc via the transistor Q20 to the previous stage device 202 to cause the sink chip voltage to be 0 V.

In Embodiment 1, the electric current supplied to the previous stage device 202 becomes less than, for example, 100 µA. This 100 µA rests in a range, in which operations of the previous stage device 202 and the image signal input circuit 200 are not affected due to supplying of the electric current from the image signal input circuit 200 to the previous stage device 202.

As described above, according to Embodiment 1, the sink chip voltage contained in the image signal is held to be 0 V, and the operation point for connecting the image signal input circuit 200 to the subsequent stage circuit 202 is determined.

In Embodiment 1, the inflowing current (Current I230 of weak electric current source 230-Base current of transistor Q30) in the input terminal IN1 is very small. Therefore, it is possible to reduce a rate of sag of the input CSVB signal.

Further, in Embodiment 1, it is possible to adjust the sink chip voltage to be held by changing the ratio (N10: N20) of the numbers of the transistors Q10 and Q20.

For example, when the CVBS signal input from the input terminal IN1 is for the standard-definition (SD), the sink chip voltage may be held to be 0.1 V. When the CVBS signal input from the input terminal IN1 is for the high-definition (HD), the sink chip voltage may be held to be 0.15 V.

Figure 3:
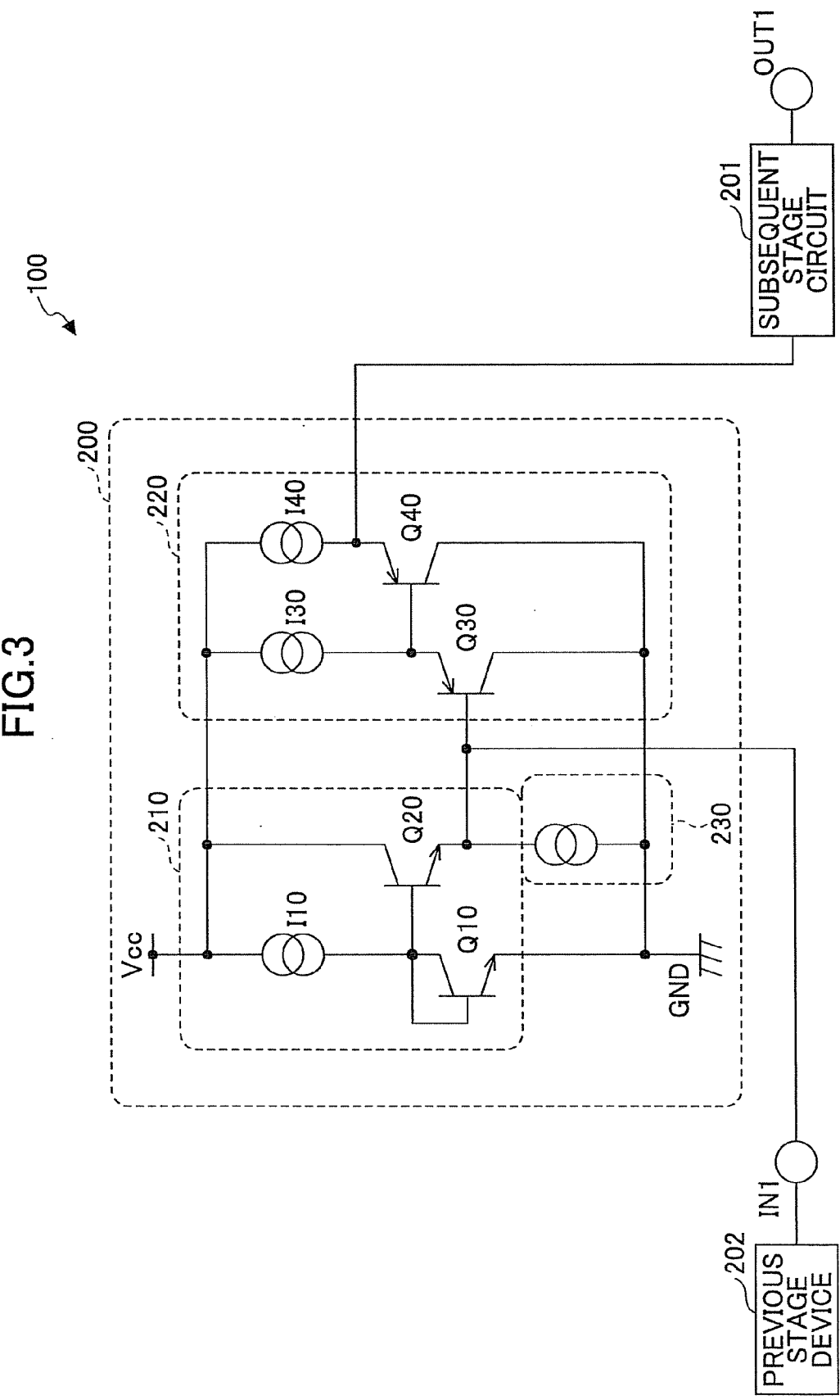
FIG. 3 is a second view for illustrating the image signal input circuits of Embodiment 1.

Next, referring to FIG. 3, an operation of the image signal input circuit 200 of Embodiment 1 is described when the image signal input circuit 200 is connected to the previous stage device 202. FIG. 3 is a second view for illustrating the image signal input circuits of Embodiment 1.

The image signal input from the previous stage device 202 always has a voltage of 0 V or more. Therefore, when the previous stage device 202 is directly connected to the image signal input circuit 200, the voltage of the input terminal IN1 becomes always higher than a voltage of turning off the transistor Q20 of the clamp circuit 210. Therefore, the clamp function is not performed by the clamp circuit 210, and the image signal input from the previous stage device 202 is directly supplied to the level shift circuit 220.

When the image signal containing the sink chip is directly input to the image signal input circuit 200 from the previous stage device 202, the sink chip voltage is held constant.

The image signal input circuit 200 of Embodiment 1 turns the clamp function of the clamp circuit 210 off, and the image signal, in which the sink chip voltage is held constant, is subjected to direct level-shifting to be output from the subsequent stage circuit 201.

As described, it is possible to use the driver IC 100 in the conventional way with the capacitor on the outside of the driver IC 100, and it is also possible to use the driver IC 100 by directly connecting the driver IS to the previous stage device 202 without interposing the capacitor. The driver IC 100 including the image signal input circuit 200 of Embodiment 1 may be installed in the conventionally available substrate on which the capacitor is installed. Therefore, existing resources are not wasted.

Figure 4:
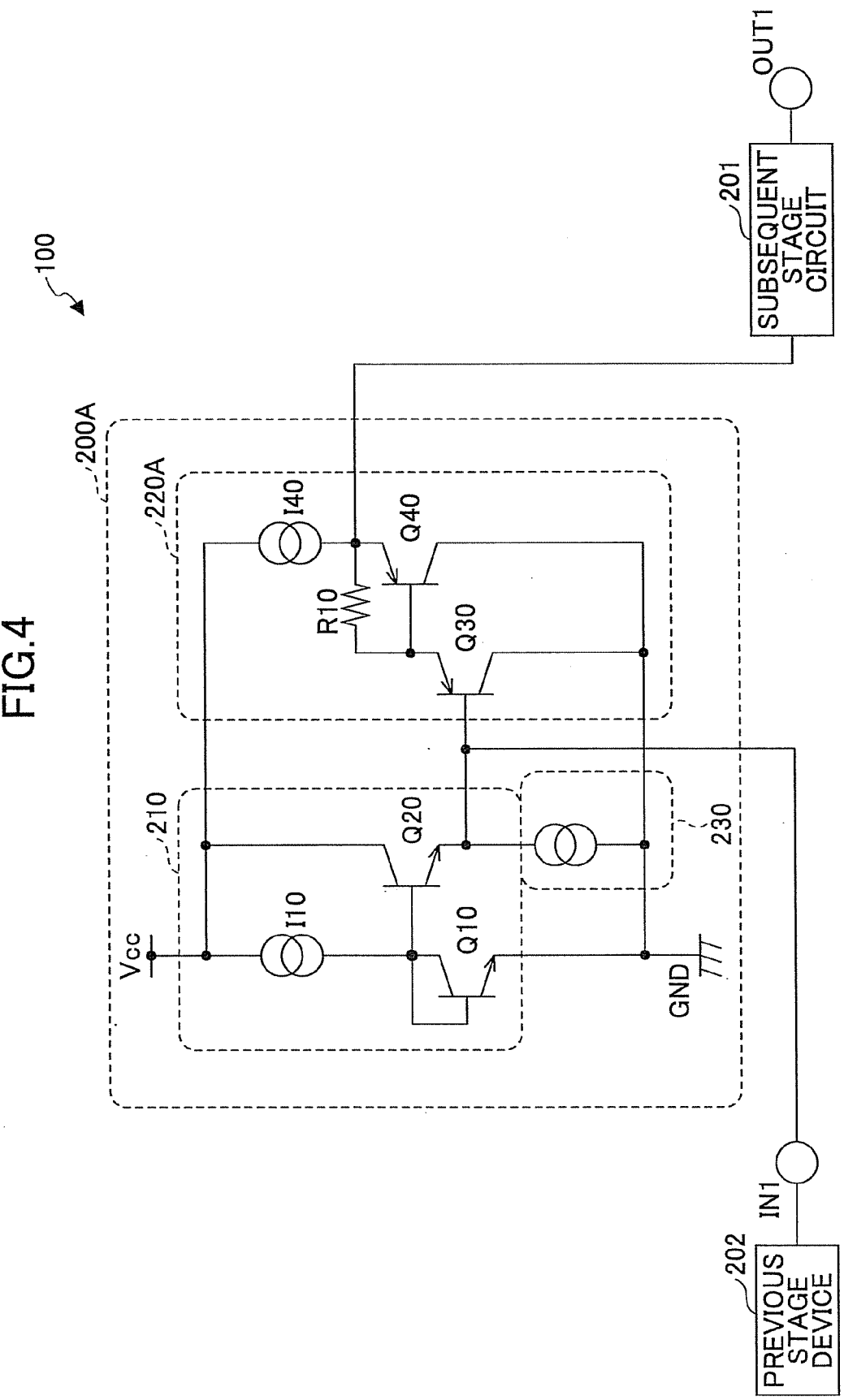
FIG. 4 illustrates a first modified example of the image signal input circuits of Embodiment 1.
Figure 5:
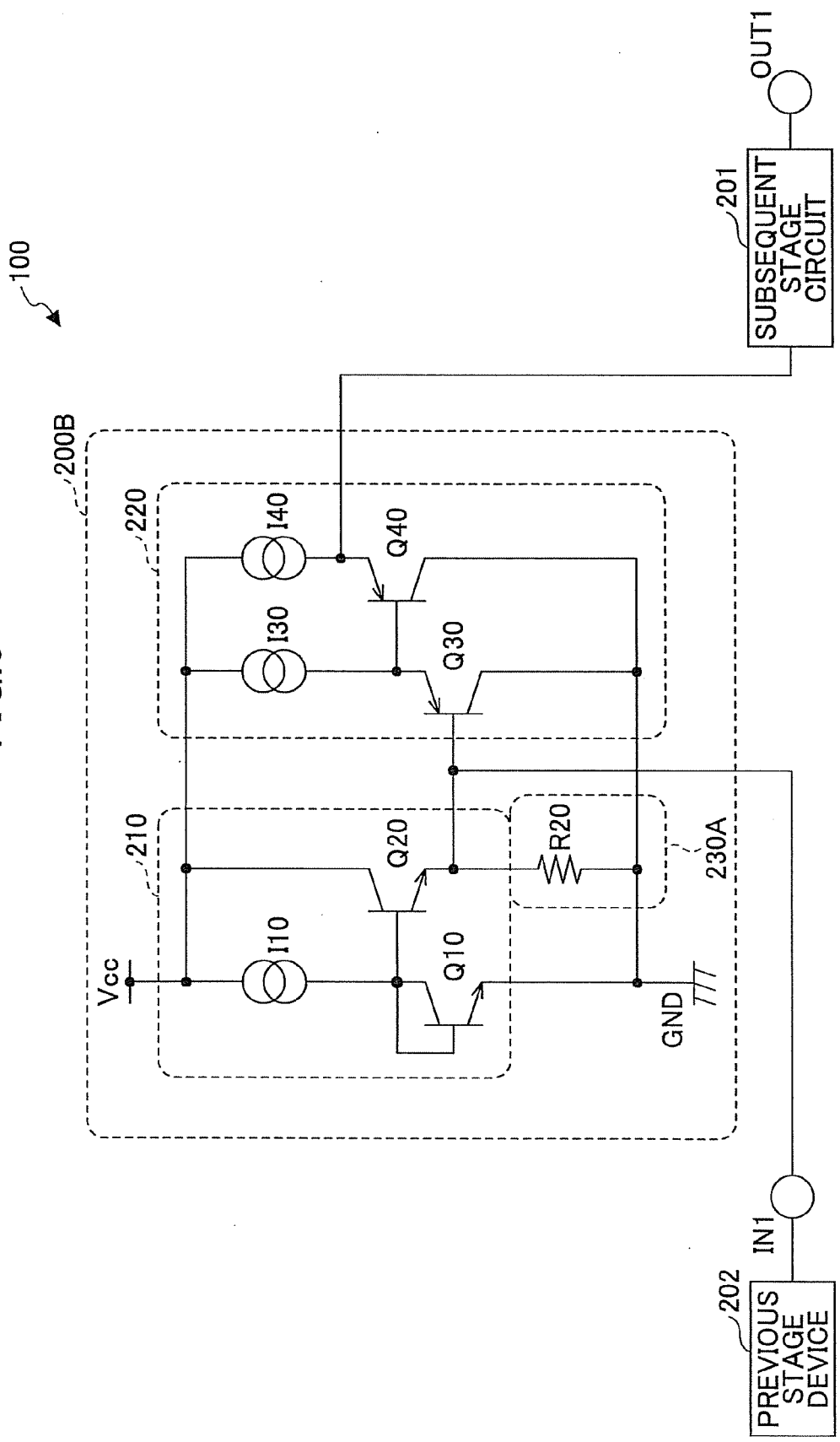
FIG. 5 illustrates a second modified example of the image signal input circuits of Embodiment 1.

Referring to FIG. 4 and FIG. 5, a modified example of Embodiment 1 is described. FIG. 4 illustrates a first modified example of the image signal input circuits of Embodiment 1.

Referring to FIG. 4, a resistor R10 is used instead of the electric current source I30 in the level shift circuit 220A. The resistor R10 is connected between a connecting point of the electric current source I40 and the emitter of the transistor Q40 and the emitter of the transistor Q30. FIG. 5 illustrates a second modified example of the image signal input circuits of Embodiment 1. In the image signal input circuit 200B, the weak electric current source 230 is realized by a resistor R20.

In the above, there has been described holding the sink chip voltage constant in the image signal input circuit 200. Further, the image signal input circuit 200 of Embodiment 1 may be used as an input circuit of an image signal that does not contain the sink chip. In the image signal input circuit 200 of Embodiment 1, the voltage of the input terminal IN1 is set higher than a voltage of turning off the transistor Q20. Then, the clamp circuit 210 is turned off to thereby function as an input circuit of the bias type. The voltage of turning off the transistor Q20 is approximately, for example, 0 V.

Figure 6:
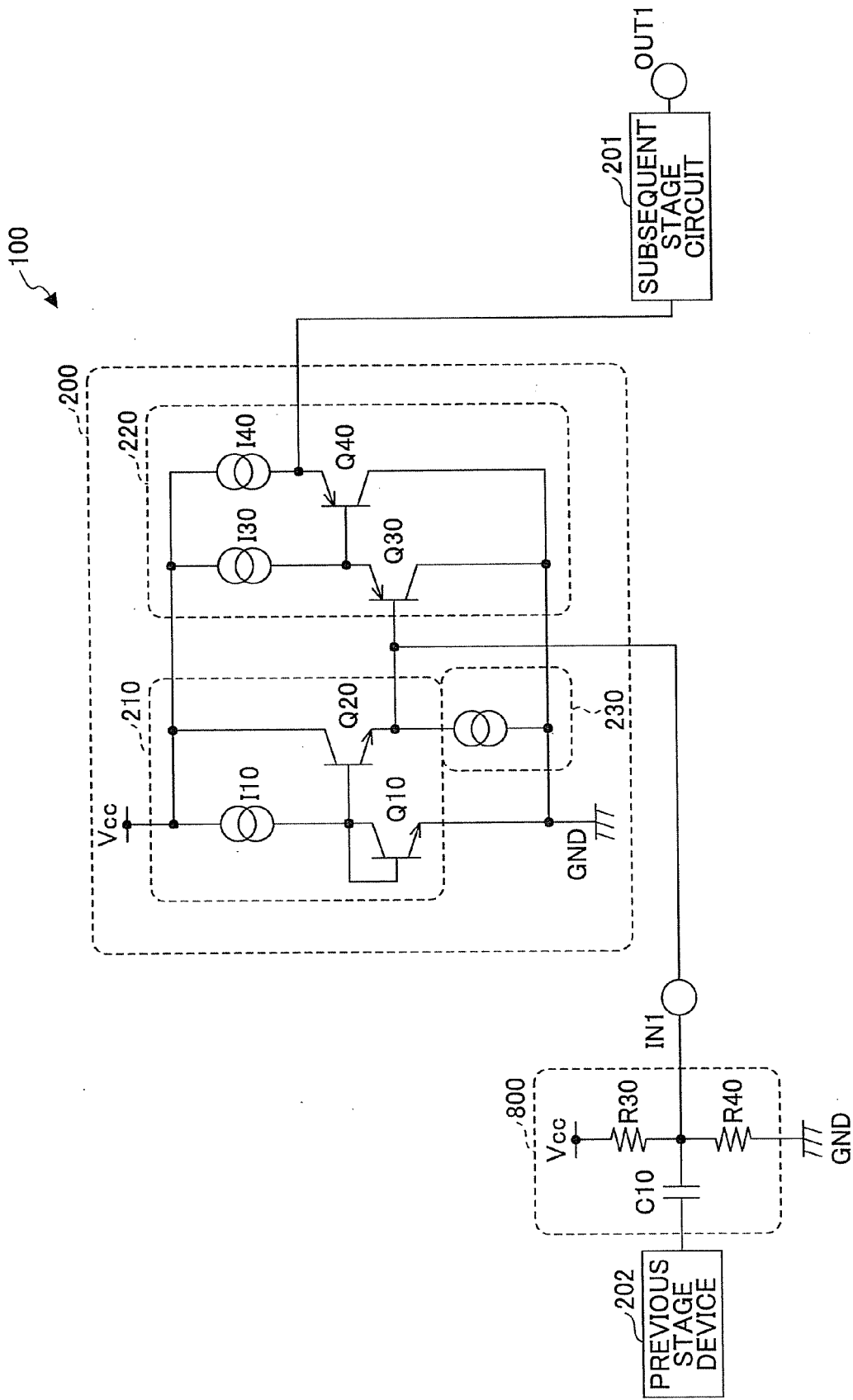
FIG. 6 illustrates one of the image signal input circuits of Embodiment 1 functioning as an input circuit of the bias type.

FIG. 6 illustrates one of the image signal input circuits of Embodiment 1 functioning as an input circuit of the bias type.

When the image signal input circuit 200 is operated as the input circuit of the bias type, an external circuit 800 is provided between the input terminal IN1 and the previous stage device 202 to make the voltage of the input terminal IN1 higher than the voltage of turning off the transistor Q20.

The external circuit 800 includes a resistor R30, a resistor R40 and a capacitor C10. The resistor R30 and the resistor R40 are connected in serial between the power source Vcc and the ground GND to thereby divide the voltage of the power source Vcc. A connecting point between the resistor R30 and the resistor R40 is connected to the input terminal IN1. Therefore, the voltage of the input terminal IN1 is a voltage divided by the resistor R30 and the resistor R40. The ohmic values of the resistor R30 and the resistor R40 are determined in order to always turn off the clamp function by generating the divided voltage in consideration of the amplitude of the signal. The capacitor C10 is connected between the connecting point between the resistor R30 and the resistor R40 and the previous stage device 202.

By providing the external circuit 800, the voltage of the input terminal IN1 becomes a voltage of turning off the transistor Q20 or more. Thus, the transistor Q20 is reversely biased, thereby causing the clamp circuit to perform its function. When the function of the clamp circuit is not performed, the image signal input circuit 200 and the external circuit 800 function as the input circuit of the bias type.

For example, in the driver IC 100 of Embodiment 1, the signal containing the sink chip is input to the input terminal IN1, the input terminal IN2 and the input terminal IN6. Therefore, the input terminal IN1, the input terminal IN2 and the input terminal IN6 may be directly connected to the previous stage device 202. Further, the input terminal IN1, the input terminal IN2 and the input terminal IN6 may be connected to the previous stage device 202 via the capacitor, in a conventional manner.

A signal without containing the sink chip is input to the input terminal IN1, the input terminal IN2 and the input terminal IN6 of the driver IC 100. Therefore, the image signal input circuits 400, 500 and 600 function as input circuits of the bias type by providing the external circuit 800 between the input terminals IN3, IN4 and IN5 and the previous stage device 202.

The conventional driver IC for image signals uses an input circuit (an input circuit of the clamp type) having a clamp circuit. An input circuit of the bias type is used in order to process a signal which does not contain the sink chip. In the conventional driver IC, there are input terminals of the clamp type and input terminals of the bias type.

When the conventional driver IC is connected to the previous stage device, terminals from which a signal containing the sink chip is output are connected to the input terminal of the input circuit of the clamp type. The terminal, from which the signal which does not contain the sink chip is output, is required to be connected to the input terminal of the input circuit of the bias type.

When the conventional driver IC is connected to the previous stage device, it is necessary to consider connections of the terminals.

In the driver IC of Embodiment 1, the image signal input circuit 200 may be changed to the input circuit of the bias type by only providing the external circuit 800 between the input terminal IN1 and the previous stage device 202. In Embodiment 1, it becomes unnecessary to consider the connections of the terminals unlike the conventional driver IC.

Referring to FIG. 6, an example in which the external circuit 800 is connected to the image signal input circuit 200 has been described. However, the external circuit 800 may be connected to the image signal input circuit 200A in FIG. 4 and the image signal input circuit 200B in FIG. 5. The external circuit 800 may also be used for image signal input circuits to be described in Embodiments 2 and 3. When the external circuit 800 is connected to the image signal input circuits 200A, 200B, and the image signal input circuits of Embodiments 2 and 3, the effects similar to those described in Embodiment 1 are obtainable.

Embodiment 2

Next, Embodiment 2 of the present invention is described with reference to the figures. Embodiment 2 differs from Embodiment 1 at a point that a circuit for increasing a withstand voltage of the image signal input circuit is provided. In Embodiment 2, only portions different from Embodiment 1 are described. Reference symbols are used for the same portions as those of Embodiment 1, and descriptions of these portions are omitted.

Figure 7:
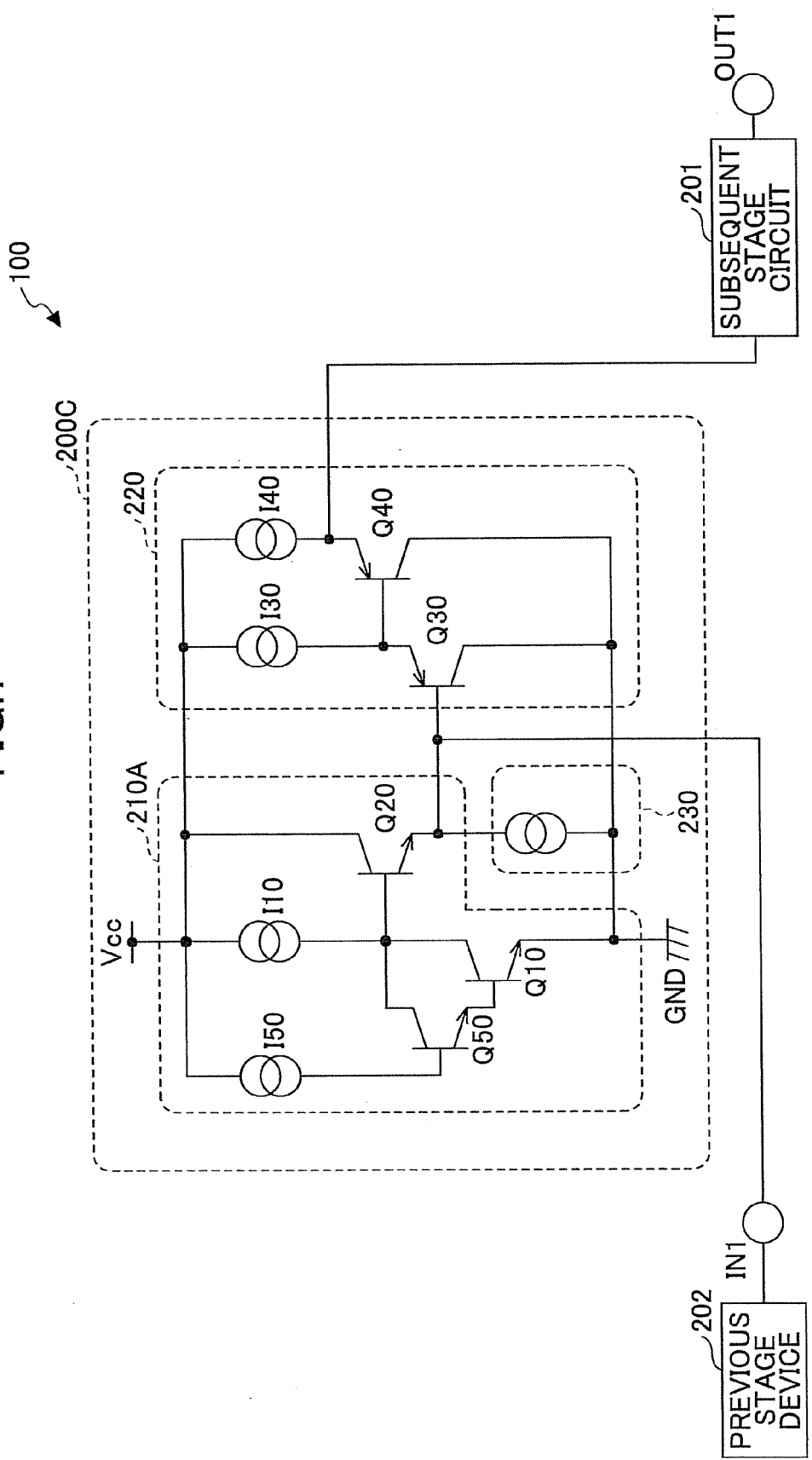
FIG. 7 is a view for illustrating the image signal input circuits of Embodiment 2.

FIG. 7 is a view for illustrating the image signal input circuit of Embodiment 2.

A clamp circuit 210A of an image signal input circuit 200C further includes a transistor Q50 and an electric current source I50 in addition to the electric current source I10, the transistor Q10 and the transistor Q20 of Embodiment 1. In the clamp circuit 210A of Embodiment 2, the collector of the transistor Q50 is connected to the collector of the transistor Q10, the emitter of the transistor Q50 is connected to the base of the transistor Q10, and the base of the transistor Q50 is connected to the electric current source I50.

In Embodiment 2, when the base and the collector of the transistor Q10 are connected to the emitter and the collector of the transistor Q50, it is possible to increase a withstand voltage between the input terminal IN1 and ground GND by utilizing saturation of the transistor Q50.

In Embodiment 2, the withstand voltage between the input terminal IN1 and ground GND becomes the sum of a withstand voltage BVbeo between the base and the emitter of the transistor Q20 and a withstand voltage BVceo between the collector and the emitter of the transistor Q10. In Embodiment 2, provided that the withstand voltage BVbeo between the base and the emitter of the transistor Q20 is 6.8 V, and the withstand voltage BVceo between the collector and the emitter of the transistor Q10 is 25 V, a withstand voltage between the input terminal IN1 and the ground becomes 31.8 V.

Meanwhile, in Embodiment 1, a withstand voltage between the input terminal IN1 and ground GND becomes the sum of the withstand voltage BVbeo between the base and the emitter of the transistor Q20 and a forward voltage of the transistor Q10. Provided that the withstand voltage BVbeo between the base and the emitter of the transistor Q20 is 6.8 V, and the forward voltage of the transistor Q10 is 0.7 V, a withstand voltage between the input terminal IN1 and ground GND becomes 7.5 V.

Therefore, it is known that the withstand voltage of the image signal input circuit 200C of Embodiment 2 is greater than the withstand voltage of the image signal input circuit 200 of Embodiment 1. In Embodiment 2, since the withstand voltage between the input terminal IN1 and the ground is increased, it is possible to increase the maximum rating and the withstand voltage.

Embodiment 3

Next, Embodiment 3 of the present invention is described with reference to figures. Embodiment 3 differs from Embodiment 1 at a point that a circuit for increasing a withstand voltage of the image signal input circuit is provided. In Embodiment 3, only portions different from Embodiment 1 are described. Reference symbols are used for portions the same as those of Embodiment 1, and descriptions of these portions are omitted.

Figure 8:
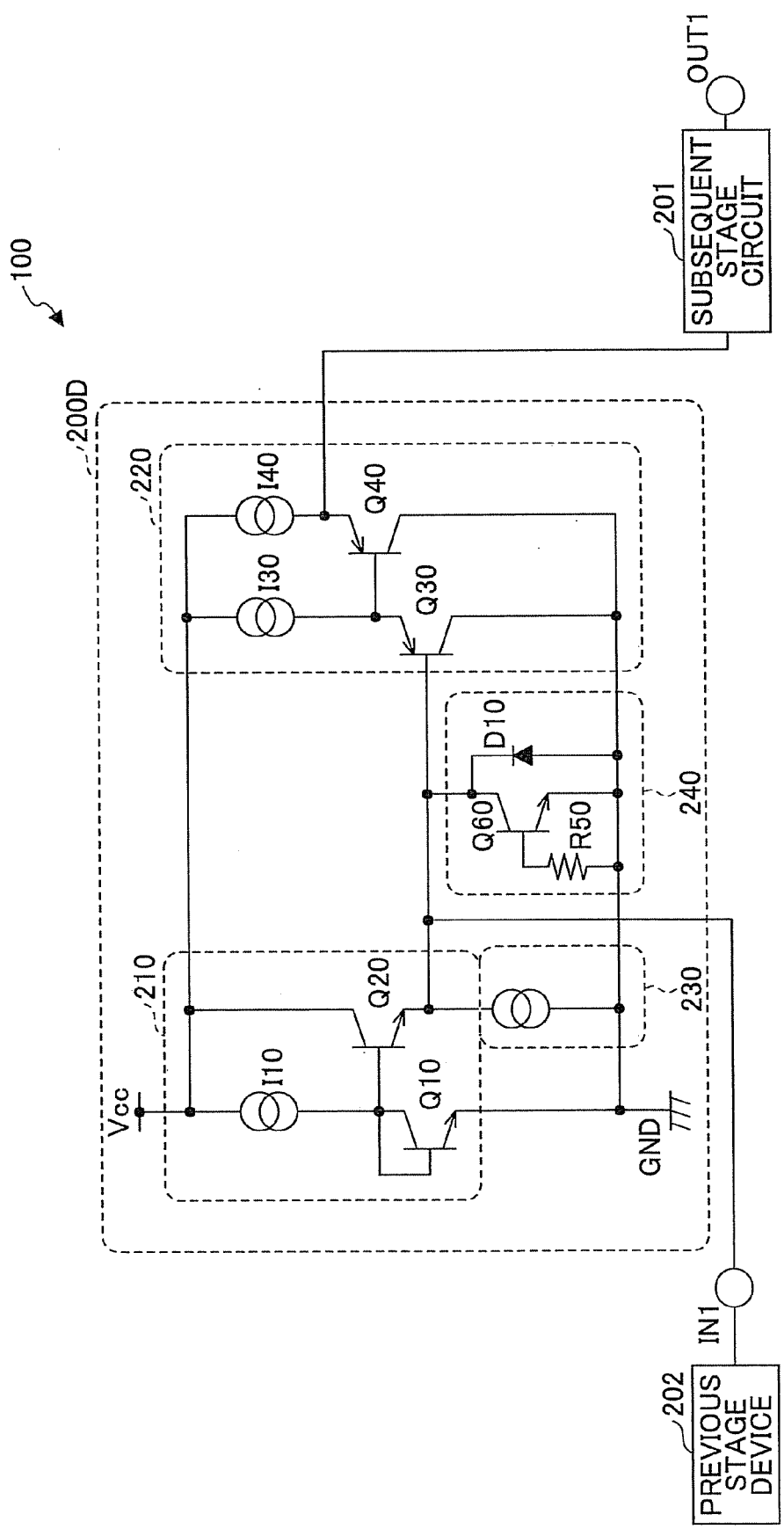
FIG. 8 is a view for illustrating the image signal input circuits of Embodiment 3.
Figure 9:
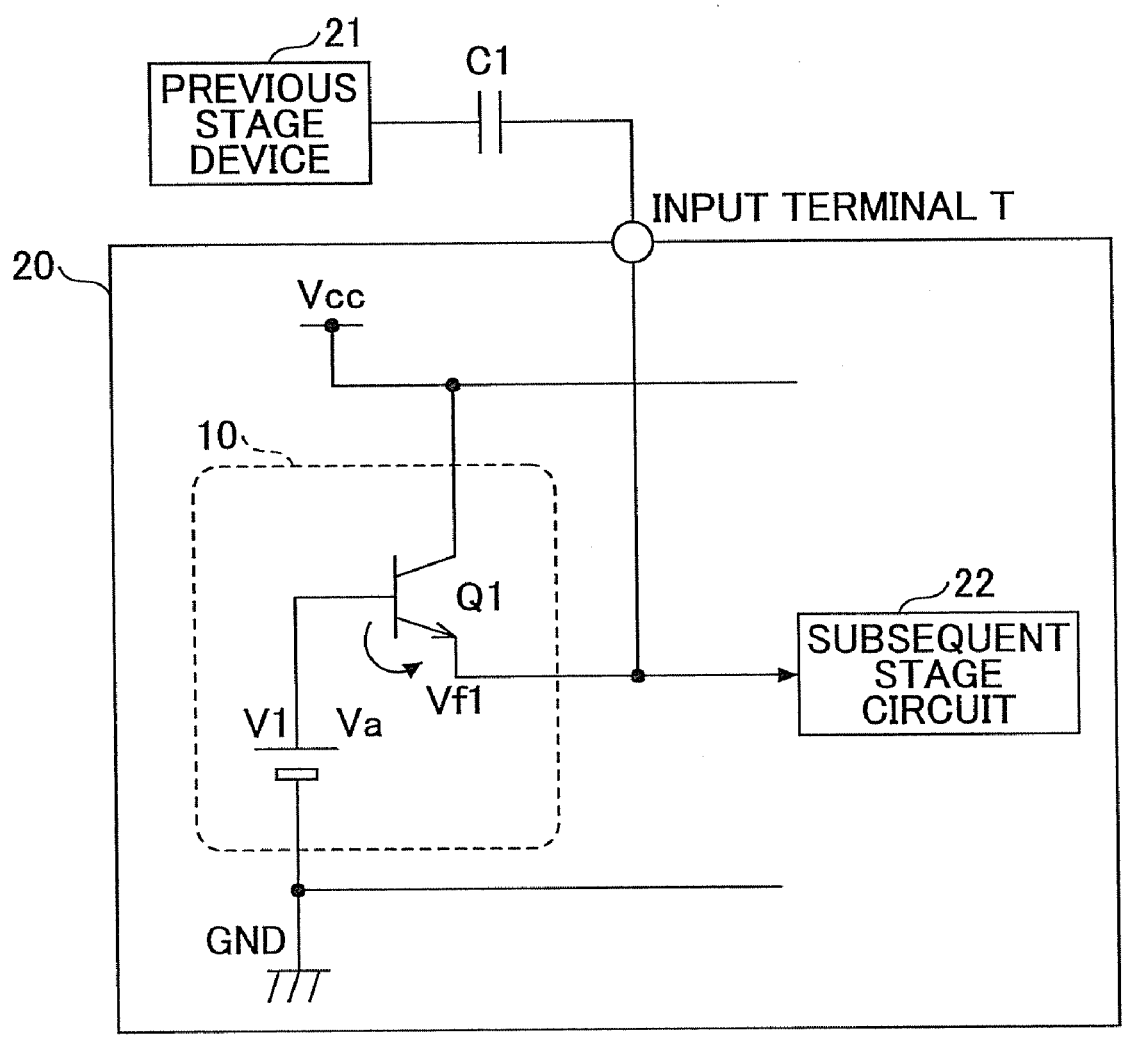
FIG. 9 illustrates an example of conventional clamp circuits.

FIG. 8 is a view for illustrating the image signal input circuit of Embodiment 3.

An image signal input circuit 200D of Embodiment 3 includes a protection circuit 240. The protection circuit 240 of Embodiment 3 includes a diode D10, a protection transistor Q60 and resistor R50. The cathode of the diode D10 is connected to the input terminal IN1, and the anode of the diode D10 is connected to ground GND. The protection transistor Q60 is connected in parallel with the diode D10. The collector of the protection transistor Q60 is connected to the input terminal IN1, and the base of the protection transistor Q60 is connected to ground GND via the resistor R50.

A diode having a low withstand voltage (e.g. 22 V) is used as the diode D10 of the protection circuit 240 of Embodiment 3. The protection transistor Q60 of the protection circuit 240 of Embodiment 3 is, for example, a transistor having a primary breakdown voltage (breakdown voltage) of 36 V and a turning-on voltage after passing the primary breakdown voltage (snapback voltage) of 16 V. In Embodiment 3, when an excessive voltage is applied to the input terminal IN1, breakdown occurs at a voltage lower than the break voltages (disruptive voltage) of the clamp circuit 210, the level shift circuit 220 and the weak electric current source 230, which are to be protected. In Embodiment 3, it is possible to prevent the clamp circuit 210, the level shift circuit 220 and the weak electric current source 230 from having the excessive voltage applied.

As described, the image signal input circuit of the embodiments of the present invention can be directly connected, without installing the capacitor, to the previous stage device by the clamp function, which is installed in the image signal input circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An image signal input circuit comprising:
an input terminal configured to receive an image signal;
a clamp circuit configured to hold a sink chip voltage contained in the image signal to be a predetermined value;
a level shift circuit that includes a first emitter follower having a first transistor and a first current source, and a second emitter follower having a second transistor and a second current source, a base of the second transistor being connected to an emitter of the first transistor, the level shift circuit being configured to shift a level of the sink chip voltage held to be the predetermined value; and
an electric current source configured to attract a base current of the first transistor.

2. The image signal input circuit according to claim 1, wherein the clamp circuit includes
a third transistor having a collector and a base connected to each other,
a third current source for supplying an electric current to the third transistor, and
a fourth transistor for supplying the electric current to the input terminal.

3. The image signal input circuit according to claim 1, wherein the clamp circuit holds the sink chip voltage to be 0 V.

4. The image signal input circuit according to claim 2, wherein the clamp circuit further includes a fifth transistor and a fourth electric current source, and
a collector of the fifth transistor is connected to the collector of the third transistor, an emitter of the fifth transistor is connected to the base of the third transistor, and a base of the fifth transistor is connected to the fourth electric current source.

5. The image signal input circuit according to claim 1, further comprising:
a protection circuit connected between an input terminal and a ground,
wherein the protection circuit includes a diode having a withstand voltage lower than disruptive voltages of the clamp circuit, the level shift circuit and the electric current source, and a protection transistor connected in parallel.

6. The image signal input circuit according to claim 2, wherein when the voltage of the input terminal becomes greater than a voltage at which the fourth transistor turns off, a clamp function of the clamp circuit is stopped.

* * * * *